United States Patent [19]

Poehler

[11] 4,191,979

[45] Mar. 4, 1980

[54] DEVICE FOR EXTRACTING AND POSITIONING VIDEO TAPE FROM A CASSETTE TO AROUND A SLIT HEAD DRUM

[76] Inventor: Herbert Poehler, Rosenstrasse 17, 6055 Hausen, Fed. Rep. of Germany

[21] Appl. No.: 922,499

[22] Filed: Jul. 6, 1978

[30] Foreign Application Priority Data

Jul. 7, 1977 [DE] Fed. Rep. of Germany ....... 2730727
Aug. 10, 1977 [DE] Fed. Rep. of Germany ....... 2735963

[51] Int. Cl.² .............................................. G11B 15/00
[52] U.S. Cl. ......................................... 360/85; 360/95
[58] Field of Search .................... 360/85, 95, 130, 132

[56] References Cited

U.S. PATENT DOCUMENTS

| 3,363,065 | 1/1968 | Tanigawa | 360/130 X |
| 4,008,489 | 2/1977 | Gilsdorf et al. | 360/85 |
| 4,012,788 | 3/1977 | Blanding | 360/95 X |
| 4,015,292 | 3/1977 | Kirn | 360/85 X |
| 4,056,834 | 11/1977 | Hiroyasu | 360/85 |
| 4,126,888 | 11/1978 | Hayashi et al. | 360/95 X |

OTHER PUBLICATIONS

I.B.M./T.D.B., vol. 9, No. 8, Jan. 1967, p. 968, "Automatic Tape Threading" by Johnson et al.

*Primary Examiner*—John H. Wolff
*Attorney, Agent, or Firm*—Holman & Stern

[57] ABSTRACT

A tape extraction apparatus for wrapping magnetic video tape from a two spool cassette to span helically and at least 360° circumferentially around a slit head drum. The apparatus has an upper and a lower kidney-shaped pair of arcuate grippers driven in arcuate paths pushing the tape out of the cassette around the head drum. In the end position around the head drum, the upper gripper rests on the lower. A clamping device holds them in position. A mechanism for driving the grippers is disclosed.

20 Claims, 29 Drawing Figures

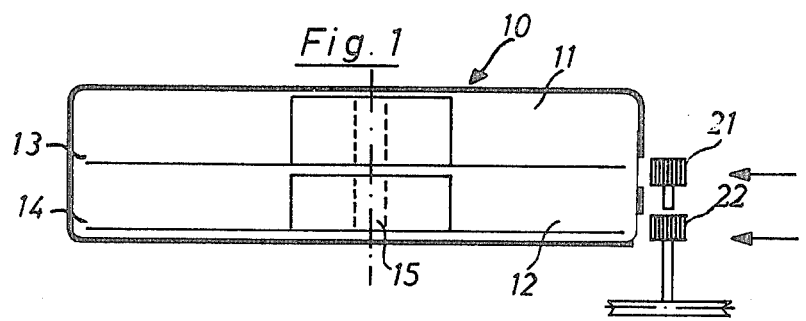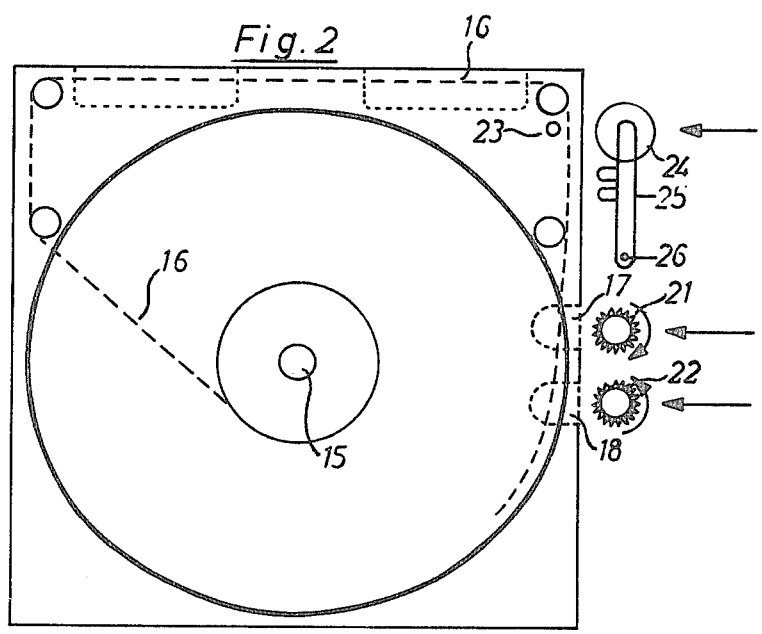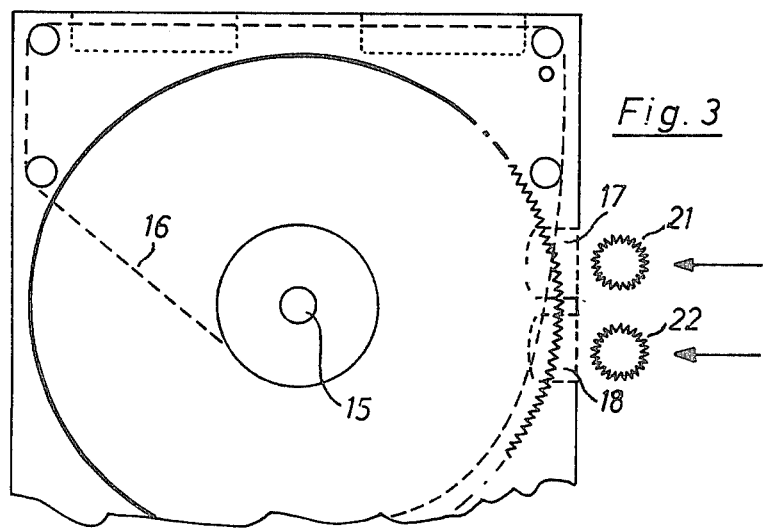

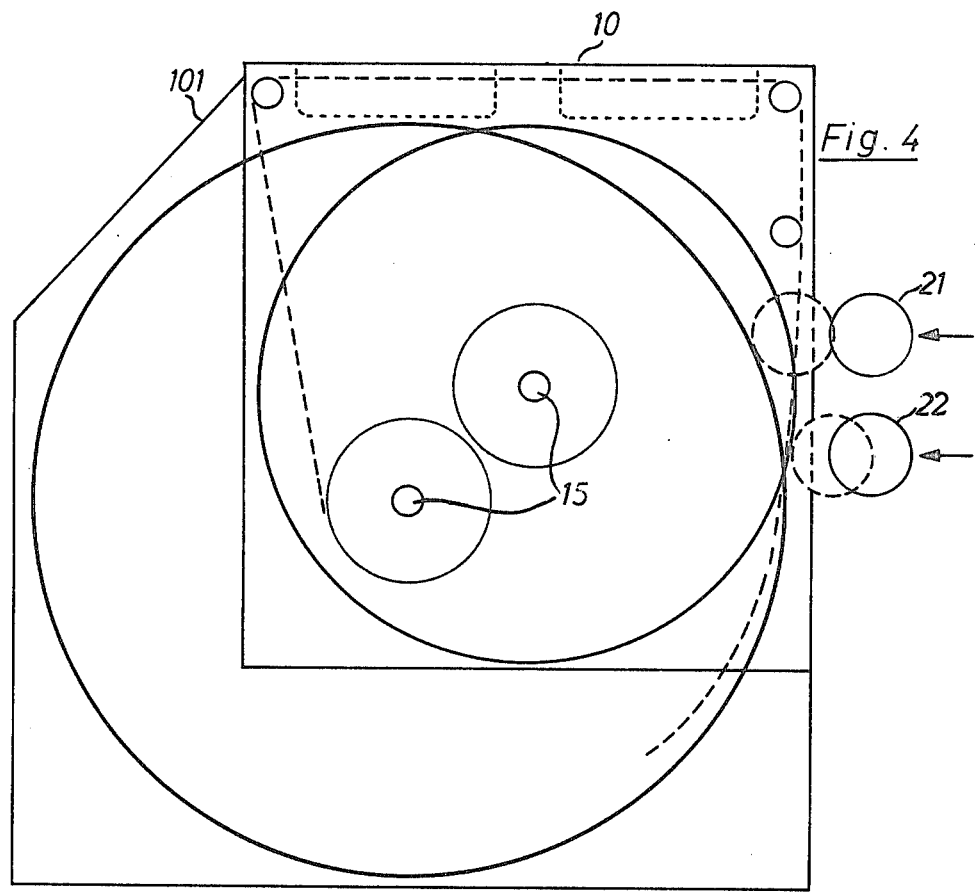
Fig. 4
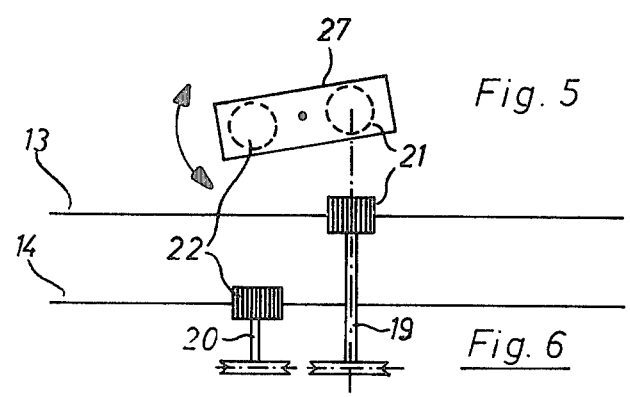
Fig. 5
Fig. 6

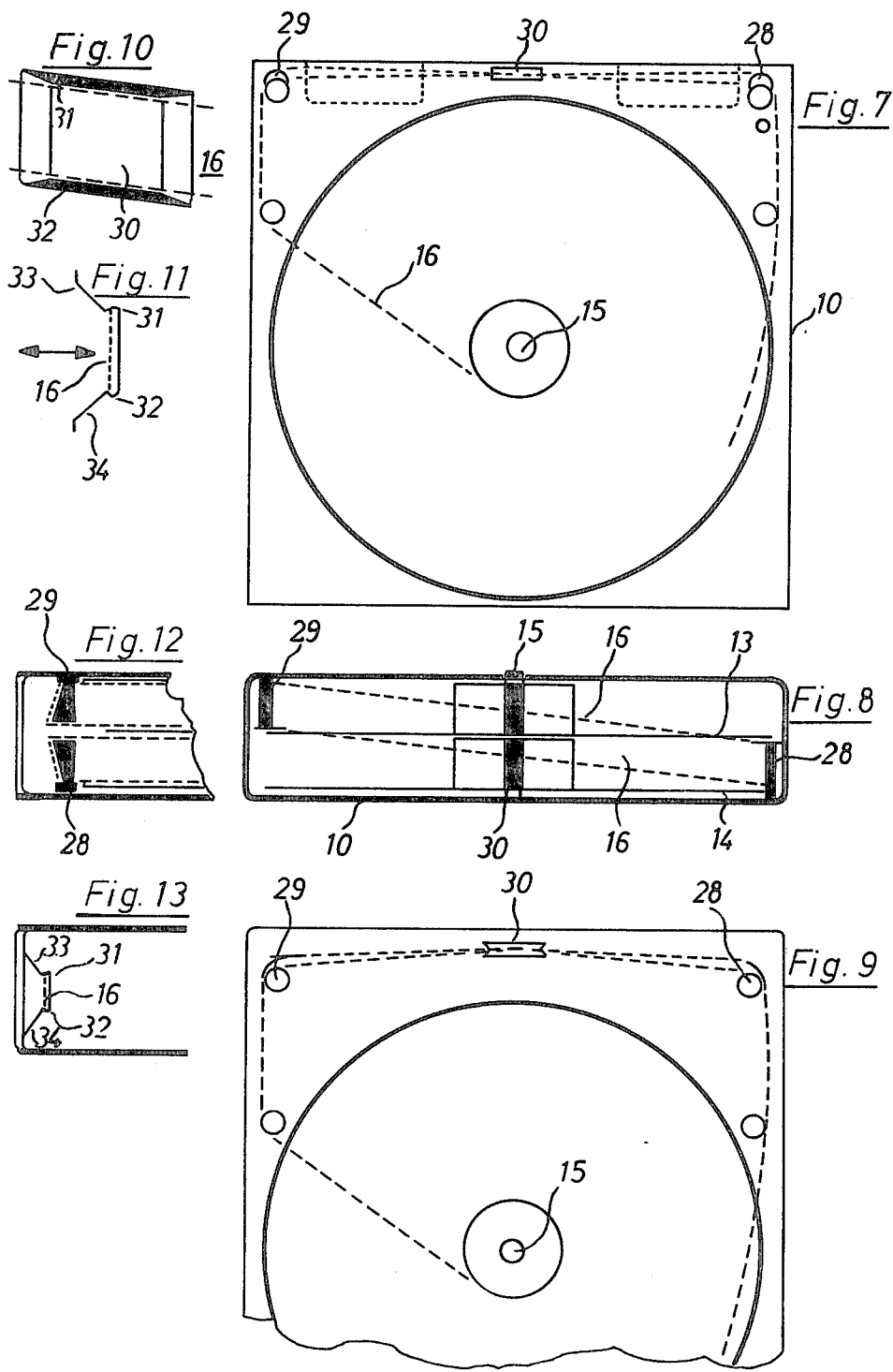

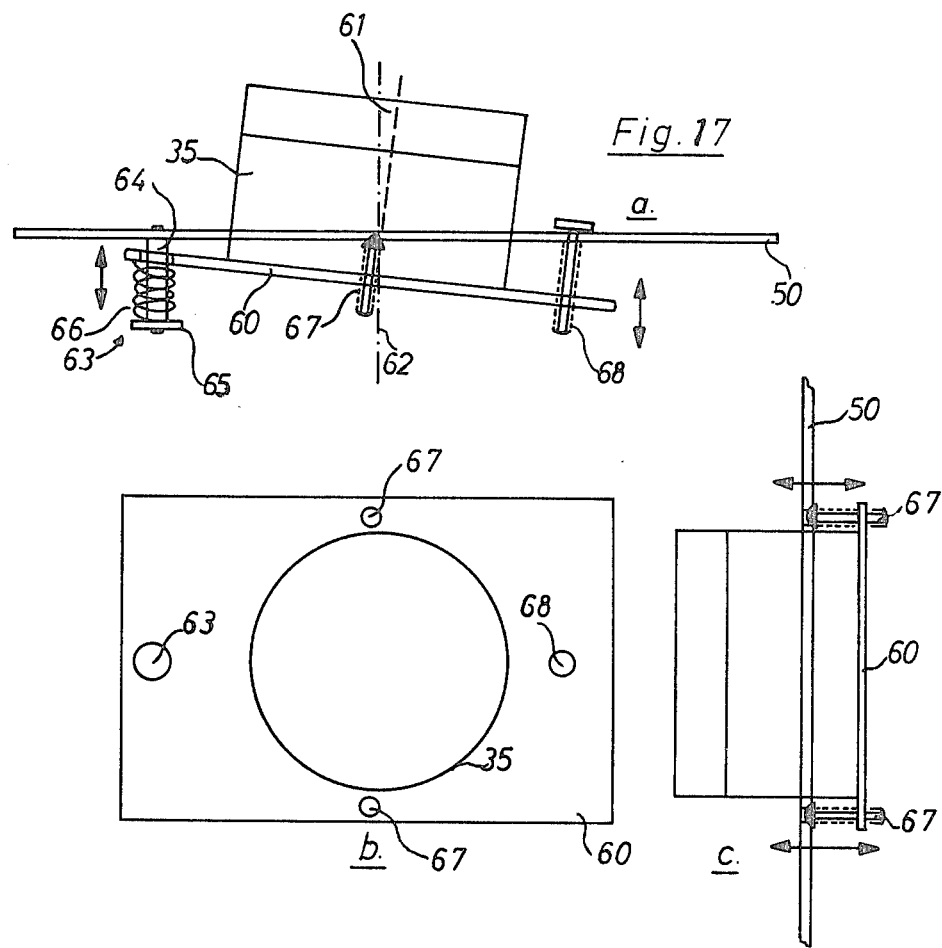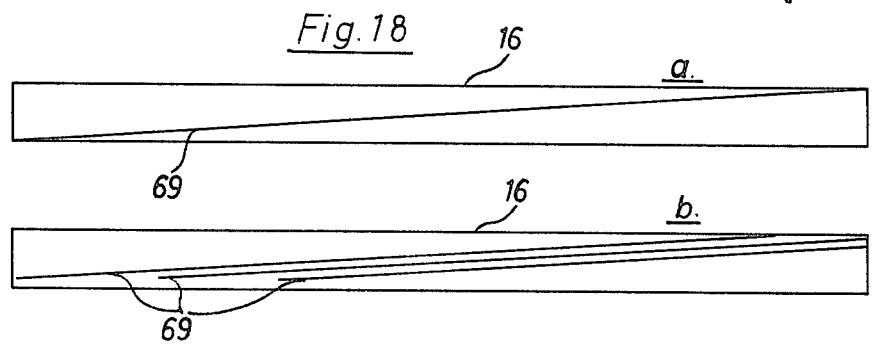

DEVICE FOR EXTRACTING AND POSITIONING VIDEO TAPE FROM A CASSETTE TO AROUND A SLIT HEAD DRUM

BACKGROUND OF THE INVENTION

The invention relates to an apparatus for recording and reproducing signals, particularly video signals, on a magnetic tape which is disposed in spools lying one above the other concentrically in a cassette and is adapted to be laid by a tape extracting device with a pair of grippers engaging behind the magnetic tape, in two tape loops running towards one another in opposite directions, against the periphery of a slit head drum in which at least one magnetic head rotates.

For the recording of picture signals and their reproduction on a magnetic tape, many diverse methods and apparatuses are known. The methods can be divided into longitudinal, transverse, and inclined trace recording. In longitudinal trace recording, the tape feed or speed is equal to the scanning speed. In order to achieve adequate playblack times for a predetermined length of magnetic tape the scanning speed must be kept low. However, the attainable upper frequency limit and consequently the quality of the television picture are thereby impaired. The process is therefore not suitable for small, inexpensive video recorders. In the transverse trace method the video signal is recorded in transverse tracks lying side by side. Although the tape speed is reduced in this process, nevertheless it is not possible to accommodate a television frame on a transverse track. The transverse trace method can therefore be put into practice technically only at great expense and is consequently also out of the question for inexpensive video recorders. Thus only the inclined trace method remains for such recorders.

The inclined trace or helical scan method has a number of advantages, which particularly affect the construction of inexpensive video recorders. These advantages include the low tape speed, which is between 4.75 and 19.05 centimeters per second, the good utilisation of the tape by means of inclined tracks, since an inclined track can accommodate an entire television frame, and also the relatively low electronic expense for the magnetic head and magnetic tape servo control. Finally, the good picture quality which can be achieved is also not to be ignored.

In order to achieve the necessary high relative speed between the magnetic head and the magnetic tape, the video heads rotate on a head disc inside a slit head drum around which the magnetic tape is slung helically. The video heads extend about 50 microns over the periphery of the head drum. The tape traction ensures good contact between the magnetic tape and the magnetic heads.

The speed of rotation of the head disc depends on the number of magnetic heads. In two-head systems, the head disc must rotate at 25 revolutions per second, and in single-head systems at 50 revolutions per second (in the NTSC system 30 and 60 revolutions per second respectively).

In addition to the number of video heads and the width of the magnetic tape, the angle of contact of the magnetic tape around the head drum is also of decisive importance for the functioning of the apparatus. In this respect a distinction is made between alpha-wrap covering 360° and omega-wrap covering slightly more than 180°. In the case of 360° wrap of the head drum only one rotating magnetic head is required. The track recorded by it contains a complete television picture, so that a stationary picture can also be scanned with good picture quality. It is however extremely difficult to achieve 360° wrap of the magnetic tape around the head drum. This difficulty is even greater when a video recorder has to work with cassettes. It is true that numerous tape extraction devices for cassette video recorders are already known. None of these however is able to lay the magnetic tape around the periphery of the head drum over an angle of 360° or more. Techniques known from spool apparatus cannot be applied to cassette apparatus. In addition, they are usually expensive.

SUMMARY OF THE INVENTION

The problem underlying the invention is therefore that of supplementing the apparatus of the kind first defined above by an inexpensive and simple tape extraction and guide device which can be used in a simple, small video recorder which works with cassettes and can apply the single-head inclined trace method with 360° wrap.

As a solution according to the invention it is proposed that at least in their end position, in which the magnetic tape is wrapped helically over at least 360° around the head drum adjusted obliquely to the plane of the apparatus, the grippers are disposed in different planes, that the upper gripper, which is in the form of a tape guide member and disposed at a greater distance from the chassis plate, should have a guide edge for the upper edge of the tape and the lower gripper, which is likewise in the form of a tape guide member, should have a guide edge for the lower edge of the tape, that the vertical height of each gripper should be slightly greater than the width of the magnetic tape, that in the end position the upper gripper should be supported by its lower side on the upper side of the lower gripper, and that the horizontal length of the tape guide members formed by the grippers should hold the tape loops, which are guided to and from the head drum by means of the grippers, at a distance from the periphery of the head drum.

It can be seen that the grippers used here are tape guide bodies which in their end position, in which they bear against the magnetic tape on the periphery of the head drum, mutually overlap in different planes and during playback and recording themselves press the magnetic tape against the periphery of the head drum. The angle of wrap thus achieved amounts to more than 360°, usually about 390° to 400°. Because of the length of the grippers those tape loops which make the connection between the tape loop guided around the head drum and the spools in the cassette are nevertheless held at a distance from the head drum. Because of the manner in which the tape is guided on the grippers, which in their end position are supported on one another, accurate positioning of the magnetic tape is in addition achieved with simple means. The entire tape extraction device is situated under the cassette trough or grouped around the head drum on the chassis plate. Despite the simple construction, which provides a good picture quality, a very compact construction of the video recorder is also achieved thereby. With simple, inexpensive means it has therefore been made possible to use the single-head inclined trace method with a 360° angle of wrap around the head drum in a video cassette recorder. Further details of the invention are explained more fully in the following description of the drawings and in the patent claims.

BRIEF DESCRIPTION OF THE DRAWINGS

The invention will be explained more fully below with the aid of some examples of embodiment which are illustrated in the drawings, in which:

FIG. 1 shows diagrammatically a section through the cassette with laterally disposed drive spindles, FIG. 2 is a plan view of the embodiment shown in FIG. 2.

FIG. 3 is a view similar to FIG. 2, the gear drive of the spindles being shown more clearly, FIG. 4 shows diagrammatically a plan view similar to FIGS. 2 and 3 in order to show the compatibility of the drive system with different sizes of cassettes, FIG. 5 is a plan view of two drive spindles combined on a single rocking lever, FIG. 6 is an elevation for more detailed explanation of the drive spindle arrangement shown in FIG. 5, FIG. 7 is a plan view of a cassette with tape guide elements at the tape outlet points, FIG. 8 is an end view of the cassette shown in FIG. 7, FIG. 9 is a partial view, corresponding to FIG. 7, with a different form of construction of a tape guide element, FIG. 10 shows on a larger scale an elevation of a tape guide element according to FIG. 9, FIG. 11 is a cross-section through the tape guide element shown in FIG. 10, FIG. 12 is a section through a corner of a cassette with tape guide elements in the form of conical surfaces, FIG. 13 shows in side view a tape guide element in the form of a slide body disposed in a cassette cutout, FIGS. 17a, 17b, and 17c show diagrammatically an elevation of the head drum with adjusting device, a plan view, and a section respectively, FIGS. 18a and 18b show diagrammatically an indication of the track path for correct and incorrect adjustment of the latter respectively.

DESCRIPTION OF THE PREFERRED EMBODIMENT

Figure 14:
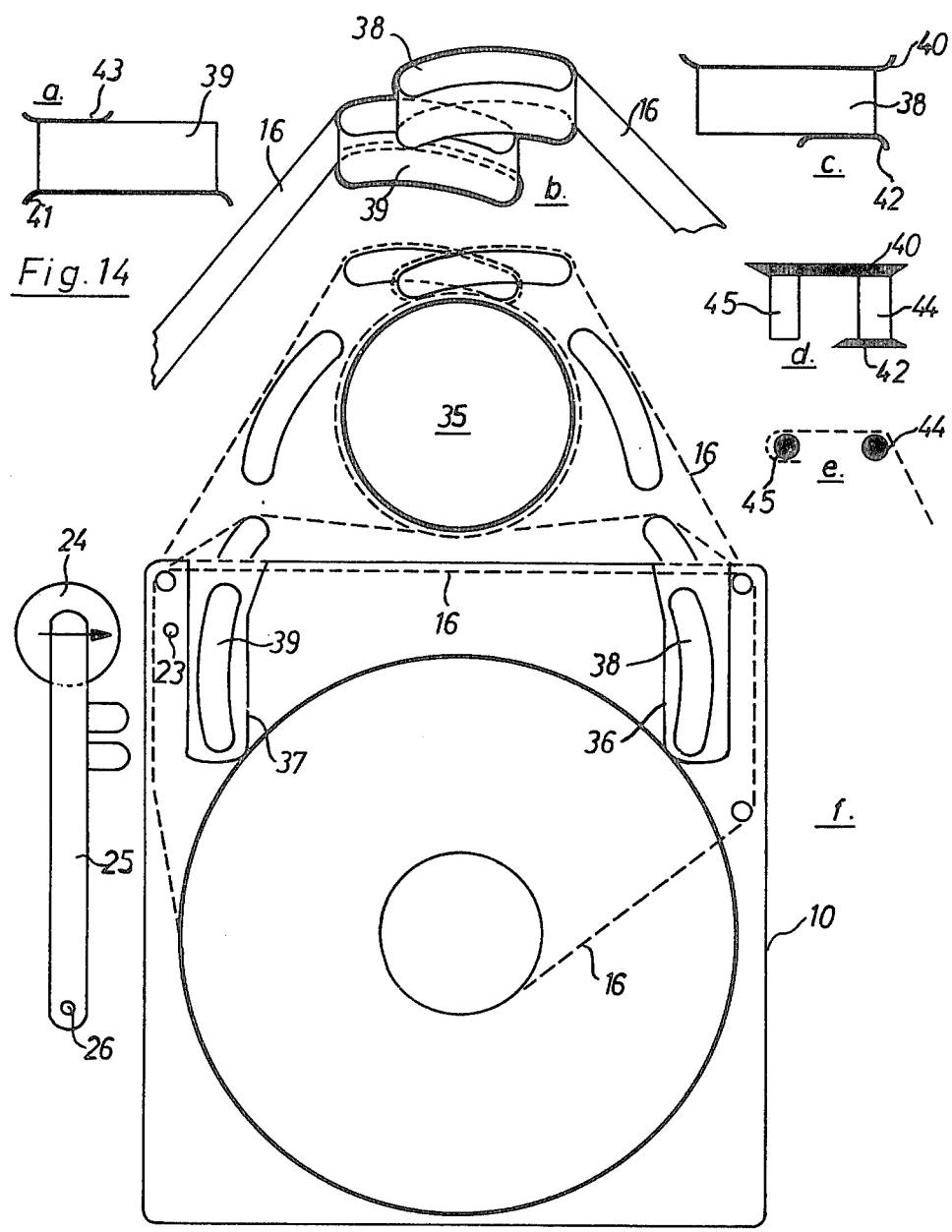
FIGS. 14a to 14f show in side view a tape extraction device with a bottom gripper, in perspective two grippers disposed one above the other in the end position, a top gripper in side view, another form of construction of a gripper consisting of two cylinders, shown in side view, a plan view of this form of construction, and a plan view of the cassette inserted into the apparatus and of the head drum in various relative positions of the grippers and of the tape in relation to the cassette and the head drum.

FIG. 1 shows a cassette 10 in which two spools 11 and 12 are disposed coaxially one above the other, these spools both having a tape plate 13, 14 and being mounted by their hubs on a common spindle 15 supported by the cassette. A magnetic tape 16 is guided from one spool to the other by means of suitable guide rollers and grippers.

The front side of the cassette 10 is open or provided with a hinged lid which opens automatically when the cassette is inserted into the apparatus. In addition, the cassette is provided in another side wall with cutouts 17,18 through which drive gears 21,22 mounted on drive spindles 19,20 (FIG. 6) are introduced into the cassette 10 and brought into engagement with tape plates 13,14 formed as toothed discs by teeth provided on their periphery. For the actual driving of the tape there are provided a tape drive shaft 23 and a rubber pressure roller 24, which is mounted, for swivelling about an articulation point 26, on a lever 25 on the other side of the magnetic tape 16, opposite the tape drive shaft 23. The tape drive shaft 23 and the rubber pressure roller 24 can also be inserted into the cassette through corresponding cutouts in the bottom and side wall of the cassette respectively. Details of the guiding of the tape and of the tape drive by means of the tape drive shaft 23 and the rubber pressure roller 24 are familiar to the specialist and do not need to be explained here. Furthermore, the mechanism by which the drive gears 21,22 are brought into mesh with the periphery of the tape plates 13,14 in dependence on operating requirements is not shown in detail.

It is however of decisive importance that here the periphery of the tape plates 13,14 is provided with a toothed rim and also that the drive is effected by means of drive gears 21,22. It is likewise important that the the drive spindles 19,20 of the drive gears 21,22 are mounted on a common rocking lever 27 (FIG. 5). In the first place it is thus possible, through a simple movement controlled by the mechanism, for only one drive gear at a time, namely that one of the two drive gears 21,22 rotating in opposite directions which is required in each particular case, to be brought into engagement with the toothed rim on the periphery of the appertaining tape plate 13,14. Secondly, as illustrated in FIG. 4, it is thereby possible to use one and the same drive system for the spools 11,12 for different sizes of cassette. Thus, FIG. 4 shows on the one hand a cassette 10 of standard size, but on the other hand a cassette 10' having a considerably larger spool diameter. As indicated in the drawing, the drive gears 21,22 can also be brought without difficuly by means of the rocking lever 27 into engagement with the toothed rims on the periphery of the tape plates. This is obviously also true when the drive gears 21,22 or their drive spindles 19,20 are each brought separately to the periphery of the tape plates by the mechanism, and not by means of a common rocking lever 27 rockable about a vertical axis, provided only that the two drive gears are slightly offset laterally in relation to one another and disposed approximately in the middle of a side face of the cassette 10. Since the spools 11,12 lie one above the other in the cassette 10 and the magnetic tape 16 has to be guided from the bottom to the top spool and vice versa, diagonal guiding of the magnetic tape is necessary. If the magnetic tape 16 is guided over the head drum, this diagonal guiding is achieved by inclining the head drum (see FIG. 17). For operations of rewinding the magnetic tape inside the cassette 10, however, so called "piping" occurs. In order to prevent this, fixed tape guide elements 28,29 having conically shaped surfaces are provided in the open side surface of the cassette.

In FIG. 7 it can be seen that these guide elements 28,29 are disposed in the corners of the open side face of the cassette 10. In an elevation viewed from the open side, FIG. 8 clearly shows that the conical tape guide element 28 is situated at the height of the bottom spool 12 in one corner of the opening, and the conical tape guide element 29 at the height of the top spool 11 in the other corner of the open side face of the cassette 10. The path followed by the magnetic tape 16 is shown in broken lines. An additional non-conical tape guide element 30 lying roughly in the centre of the open side of the cassette 10 can also be seen.

FIGS. 10, 11, and 13 show in detail the construction of the tape guide element 30. FIG. 12 shows on a larger scale the conical shape of the tape guide elements 28 and 29. It can clearly be seen that the tape guide elements 28,29 form inclined surfaces which in the region of the cassette top and bottom are at the shortest distance from the spindle 15, while in the horizontal centre plane of the cassette 10, that is to say on both sides of the tape plate 13 of the upper spool, the distance from the spindle 15 is at its maximum. Like the tape guide elements 28,29, the tape guide element 30 is also in the form of a slide member. In FIG. 10 the magnetic tape 16 is once again shown in dash-lines. It is guided by the tape guide element 30 after the style of an inclined groove which is bounded at the top by an inclined tape guide edge 31 at a slight angle to the horizontal, and at the bottom by a tape guide edge 32 parallel to the tape guide edge 31. These tape guide edges 31,32 are expediently slightly grooved in the longitudinal direction of the magnetic tape 16, so that by means of a certain retaining power they prevent the magnetic tape from passing out through the open side opening in the cassette 10. On the other hand, the grooves must be so flat that the retaining force is sufficiently slight to be overcome by the tape extraction device without damaging the edges of the tape. The tape guide edges 31,32 are in addition extended in each case by a respective tape catcher 33,34 opening in the direction of the outside of the cassette. It is thereby ensured that when the magnetic tape, which has been laid around the head drum by the tape extraction device, returns into the cassette 10, it will reliably enter between the tape guide edges 31,32.

It is expedient for the tape guide element 30 not to lie exactly on the line connecting the tape guide elements 28 and 29, but at the tip of the isosceles triangle formed by the line connecting the tape guide elements 28,29 and the tape guide element 30, the tip of which points towards the exterior of the cassette 10 (FIG. 9).

After the above explanation of the cassette 10 and of its construction, the tape extraction device will now be explained in greater detail. A basic requisite is that this device should be one for cassette operation in which the magnetic tape must be wrapped around the head drum over an angle of 360°. With an angle of wrap of 360° the magnetic tape is thus wound helically around the head drum. A complete 360° wrap makes it necessary to use, in the tape extraction device, grippers which finally ensure a certain overlap, that is to say an angle of wrap around the head drum of more than 360°.

FIGS. 14a to 14f now show details of the tape extraction device which is suitable for this purpose. FIG. 14f shows the cassette 10 of FIG. 1 in a plan view (or view from below). The magnetic tape 16 is shown in four different phases of wrapping around a head drum 35. The top and bottom faces of the cassette are provided with cutouts 36 and 37 respectively. When the cassette is inserted into the apparatus, grippers 38,39 automatically penetrate into these cutouts and thus engage behind the magnetic tape 16 in the cassette 10. For recording and playback the tape extraction device now comes into operation with an actuating and guide mechanism when the apparatus is correspondingly operated; the grippers 38 and 39 are moved towards the head drum 35 until finally the magnetic tape 16 is completely wrapped around it. The individual phases of the operation are indicated in the Figure. Each of the grippers 38, 39 performs a movement which lays the magnetic tape, drawn by it out of the cassette 10, around the head drum 35 over an angle of slightly more than 180°. In the end position of the grippers 38,39 they lie one above the other in contact, as can clearly be seen in FIG. 14b. In the end position therefore the tape loops are guided by both grippers.

For the purpose of guiding the magnetic tape 16 the grippers are additionally provided with guide plates. Thus, the upper gripper 38 has on its upper side a guide plate 40, and the lower gripper 39 has on its lower side a guide plate 41. The guide plates are distinguished in that in plan view they project slightly beyond the outer periphery of the gripper bodies themselves, and thus can form a stop edge for the side edge of the magnetic tape 16. In addition, the outer edges of the guide plates 40, 41, projecting beyond the periphery of the gripper bodies, are also bent away from the gripper body, out of the plane in which they are in contact with the gripper body, thereby facilitating the re-gripping of the magnetic tape in the event of the loss of the tape tension. Furthermore, auxiliary plates 42,43 may also be provided. As can be seen in FIGS. 2a and 2c, the auxiliary plate 42 is fastened at the bottom on the upper gripper 38, and the auxiliary plate 43 is fastened at the top on the lower gripper 39. The auxiliary plates are similar in construction to the guide plates 40, 41. However, they extend only over that portion of the mutually facing sides of the grippers which in the end position shown in FIG. 14b is not in contact with the respective other gripper body. Moreover, the auxiliary plates 42,43 are frequently completely unnecessary because, as can clearly be seen in FIGS. 14b and 14f, in the end position the grippers lie one on the other, forming an angle, to the extent of about half in each case, so that the surfaces of the grippers 38,39 lying one on the other project in each case beyond the contour of the respective other gripper and can thus themselves serve as guide edges for the magnetic tape 16. By suitable selection of the height of the grippers 38,39, and therefore of the distance between the surfaces lying one on the other and the other guide edges formed by the guide plates 40,41, it is reliably ensured that the side edges of the magnetic tape 16 helically guided around the head drum 35 will lie side by side without a gap being formed.

The grippers 38,39 are expediently in the form of roughly kidney-shaped solid bodies of metal. Their shape can clearly be seen from the drawings. Instead, it is also possible, as shown in FIGS. 14d and 14e for the upper gripper 38, for the grippers to be composed of two cylinders 44,45 disposed upright and spaced apart parallel to one another, these cylinders being joined at the top by the guide plate 40, while the outer cylinder 44 carries at the bottom the auxiliary plate 42. Instead of cylinders, it is also possible to use one or two rollers.

Figure 25:
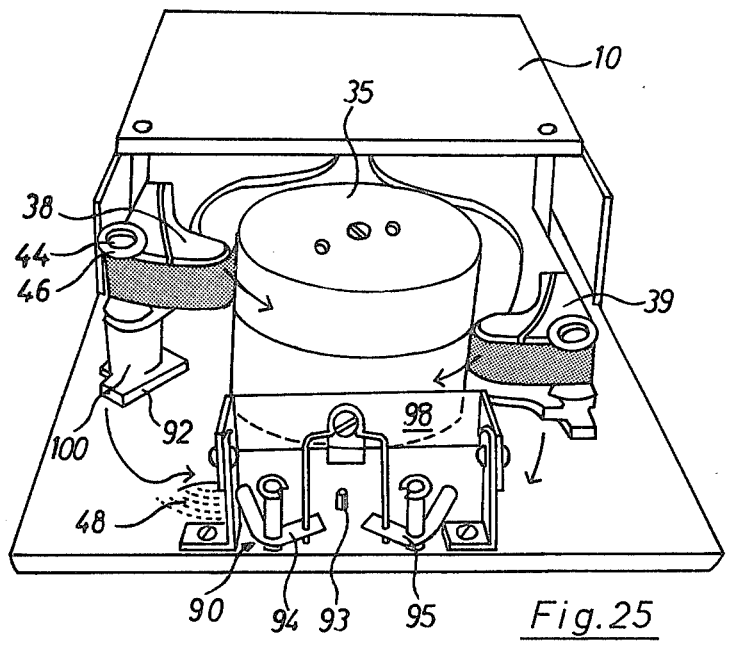
FIGS. 25 and 26 show two views in perspective of the tape extraction device with the tape partially and completely extracted.
Figure 26:
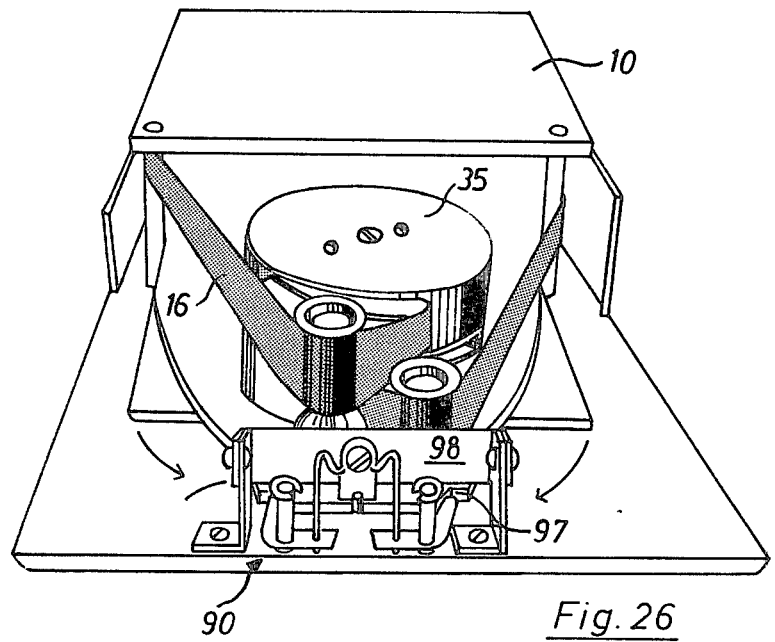

A form of construction comprising the two shapes explained above in combination is particularly advantageous for the grippers: the gripper body is in the form of a solid body of metal, which at its front end, which pulls the tape furthest around the head drum 35, is made straight, while at its rear end, which lies further outwards to the side, it is provided with the cylinder 44, which itself can be provided with a tape guide flange 46 (see FIGS. 25 and 26).

For the purpose of achieving the contact-msntioned above in connection with FIG. 14b–between the upper gripper 38 and the lower gripper 39 in the end position, it is expedient to provided a compression spring 47. This spring is disposed above the upper gripper 38, behind the head drum 35 (viewing from the cassette 10), at the point where the grippers 38,39 engage one over the other.

Figure 15:
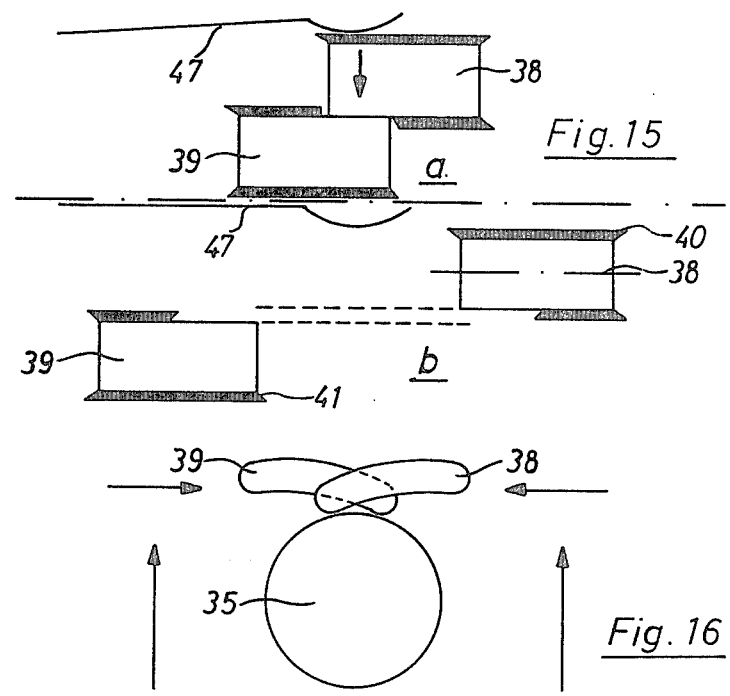
FIGS. 15a and 15b are elevations of the grippers, respectively in their end position shown in FIG. 14b and before this end position is reached.
Figure 22:
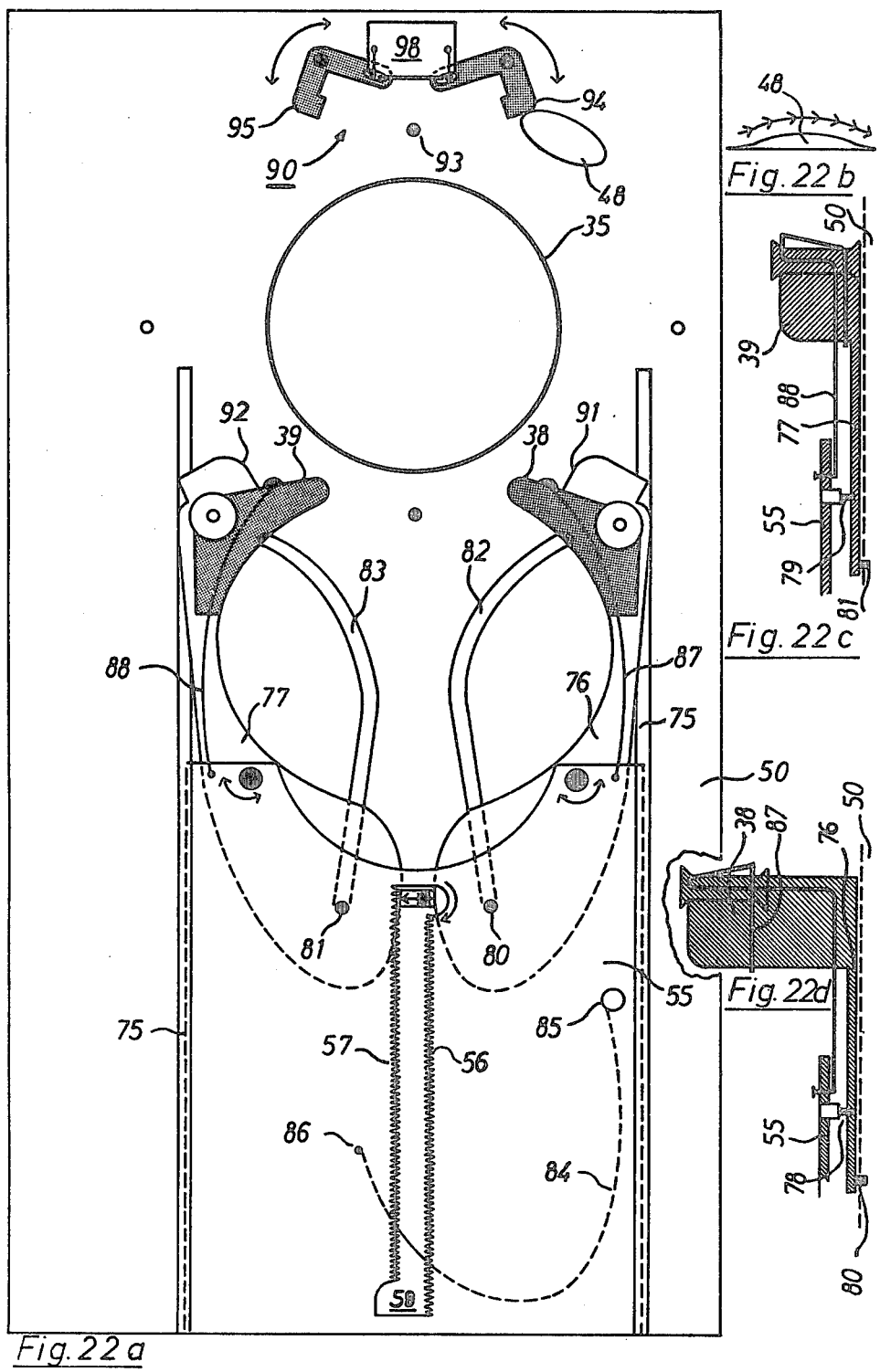

FIG. 15a shows how in this position the compression spring 47 applies to the gripper 38 a pressure force indicated by an arrow, and thus applies the said gripper against the surface of the lower gripper 39, which in turn is supported on a chassis plate of the apparatus. FIG. 15b shows the grippers 38,39 in a position just before they come to lie one on the other. As indicated by a broken line representing the bottom plane of the upper gripper 38 and a broken line representing the top plane of the lower gripper 39, the two grippers are here a short distance apart owing to the fact that the upper gripper 38 is slightly raised by a sliding lifter 48 (see FIGS. 22a and 22b) shortly before the end position is reached. It is thereby ensured that the end position shown in FIG. 15a can be reliably reached and that the side surfaces of the grippers will not in any circumstances run over one another.

The magnetic tape 16 is guided on the gripper bodies 38 and 39 by the guide plates 40, 41 and optionally by the auxiliary plates 42,43. The distance between these guide edges on the grippers 38,39 is slightly, but only very slightly, larger than the standard with of the magnetic tape 16. Tolerances in the width of the tape can thus be accepted. On the other hand, however, the clean positioning of the grippers one on the other as shown in FIG. 15a and the achievement of the distances indicated ensure that in the end position, which corresponds to recording or playback, the edges of the tape will lie one against the other without a gap. The difficulties which otherwise occur with a 360° angle of wrap as the result of overlapping of the edges of the tape, the bending-over of the edges of the tape, or gaps between the edges of the tape, are reliably avoided. The good positioning of the magnetic tape 10 in the operating position for recording and playback is therefore achieved through the fact that the grippers 38,39 are each provided, on their sides remote from the respective other gripper, with guide edges which are formed by the guide plates 40,41, and that the upper gripper 38, on reaching the end position, makes a slight movement perpendicularly to the direction of transport of the magnetic tape 16, in the direction of the lower gripper 39 if the two grippers 38,39 already overlap.

Figure 16:
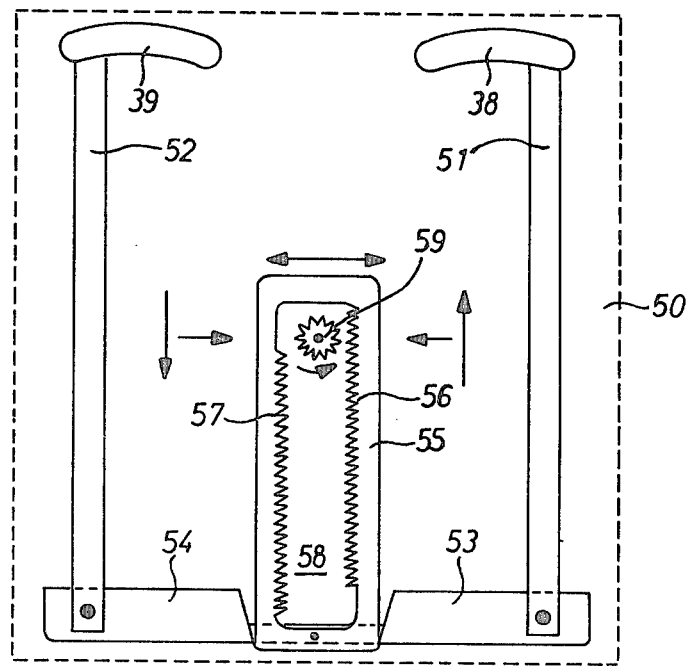
FIG. 16 shows a form of construction of the mechanism for guiding the grippers.
Figure 19:
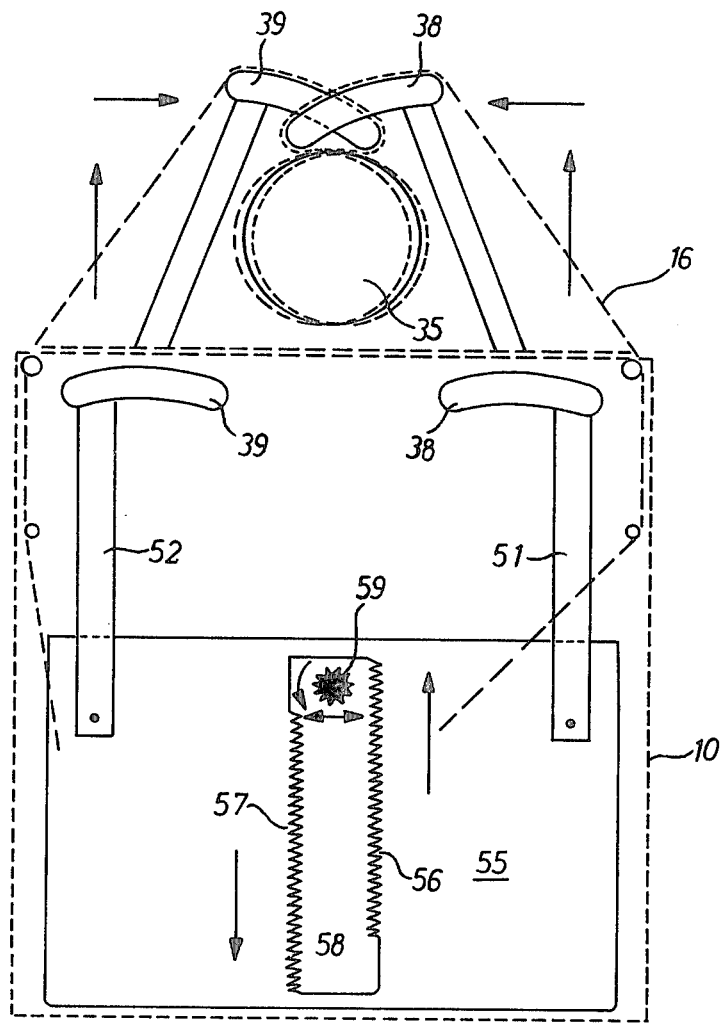
FIG. 19 shows another example for the guide mechanism of the tape extraction device, FIG. 20 another example of a guide mechanism for the grippers.

FIG. 16 shows a guide mechanism which is incorporated in the apparatus and which permits the movement of the gripper referred to above. A chassis plate 50 of the apparatus carries a mechanical linkage of the tape extraction device. This linkage consists of two roughly parallel rods 51,52, which extend generally in the tape extraction direction (see the large arrows in FIG. 16). The rods 51,52 are connected at their ends not provided with grippers 38,39 to reversing levers 53,54 which extend transversely to the rods 51,52 and connect the latter to a toothed rack frame 55. Given suitable articulation of the grippers 38,39 or of their rods to the remainder of the mechanism, the reversing levers 53,54 can be combined with the toothed rack frame 55 to form a plate (FIG. 19). It is essential in every case that the rack frame 55 should have an elongated opening 58 extending parallel to the tape extraction direction, the longitudinal edges of the said opening being formed by two toothed racks 56,57 lying opposite one another. The rack 56 extends from the upper end (in FIG. 16) of the rack opening 58 in the rack frame 55 nearly but not quite as far as the bottom end. Furthermore, the rack 57 extends from the bottom end almost but not quite as far as the upper end of the rack opening 58. The portions left free by the racks 56,57 at the bottom and top ends respectively of the rack opening 58 are rather larger than the diameter of a gear 59 which lies in the plane of the rack opening. In addition, the distance between the racks 56 and 57 transversely to the tape extraction direction, or perpendicularly to their own longitudinal direction, is greater than the diameter of the gear 59.

The gear 59 is mounted on a vertical drive spindle perpendicular to the plane of FIG. 16) and rotates continuously. By means of a jump spring system, which is not illustrated but which is familiar to the specialist, it can be brought into engagement with either the rack 56 or the rack 57 as desired by movement in the direction of the double arrow over the rack frame 55. The gear rotates in the direction of the arrow. If therefore the gear 59 has been brought into engagement with the rack 56 by means of the spring system, the rack frame 55 and thus, through the action of the reversing levers 53,54 and the racks 51,52 or the grippers carried by them, the magnetic tape are brought out of the cassette. This operation is continued until the gear 59 runs into the free portion at the bottom end of the rack opening 58 and thus no longer applies a driving force. By means of suitable guide slots, which however are not shown in detail in FIG. 16, an additional movement of the grippers 38, 39 is brought about in the transverse direction of the large arrows in FIG. 16, the grippers having now reached their end position shown at the top in FIG. 16.

If the tape is to be pulled in again for high speed forward or reverse movement or for removal of the cassette, it is sufficient for the gear 59 to be brought into engagement with the rack 57 by means of the aforesaid spring system. The entire tape extraction device then returns into the position shown in FIG. 16. The lateral or curved guiding of the grippers will be explained more fully below with reference to FIG. 20. In principle, through this kind of mechanical guidance of the grippers 38,39 an extremely flat configuration can be given to the mechanical linkage, which nevertheless ensures defined guiding of the tape in every position of the apparatus. For the correct guiding of the magnetic tape 16, applied by the grippers 38,39 against the head drum 35, on the latter, however, the correct inclined position of the head drum 35 in relation to the plane defined by the chassis plate 50 is necessary.

FIGS. 17a to 17c show a simple adjusting device for the inclined position of the head drum 35. The latter is constructed on a supporting plate 60, on which the head drum axis 61 lies perpendicularly. In order that the head drum spindle 61 may form in relation to the vertical line 62 on the chassis plate 50 the angle clearly visible in FIG. 17a, the carrier plate 60 must therefore also form the same angle with the chassis plate 50. In order now to be able to adjust this angle to the correct value, the carrier plate 60 of the head drum 35 has four-point mounting.

The four-point mounting consists firstly of a back-pressure bearing 63, which is disposed on the side remote from the cassette, behind the head drum, and is constructed as follows: a vertical pin 64 is carried by the chassis plate 50. At its bottom end is provided an abutment plate 65. The vertical pin 64 also passes through an oversize hole in the carrier plate 60, which is thus mounted so as to be freely displaceable on the vertical pin. Between the carrier plate 60 and the abutment plate 65 a compression spring 66 is inserted. The latter presses the carrier plate 60 into contact against the lower face of the chassis plate 50. A height adjusting bearing 67 is disposed on each side of the head drum 35 in the arrangement shown in FIG. 17b. The height adjusting bears 67 urge the carrier plate 60 away from the chassis plate 50. They thus also apply a back pressure to the compression spring 66. The actual adjustment of the inclination of the head drum axis 61 is effected however by means of an adjusting screw 68, which is disposed, in relation to the axis of the head drum, diametrically opposite the back-pressure bearing 63, on the side of the head drum facing the cassette, so that the four-point mounting consists of four bearing points uniformly distributed around the head drum 35. The adjusting screw 68 is a threaded screw which passes through a threaded hole in the carrier plate 60. Since the head of the adjusting screw 68 is accessible above the chassis plate 50 (see FIG. 17a), it is thus possible with simple means to effect extremely accurate adjustment of the head drum axis 61. This is particularly important when magnetic tapes which have been played on different types of apparatus are played on the apparatus described.

FIG. 18 illustrates the manner in which the magnetic tape 16 is recorded with an apparatus of this kind. The present apparatus is one in which recording or playback is effected with the aid of the single-head inclined trace method. A magnetic head rotates in the slit head drum 35. The magnetic head records in each case a complete television picture and/or frame on a single inclined track 69. For this to be possible the 360° angle of wrap of the magnetic tape 16 around the head drum 35 is necessary in the manner already explained above. The recording is effected in the inclined track 69 in a quality such that without tape feed a stationary picture can without difficulty be scanned with good picture quality by the single inclined track 69. For this purpose, however, accurate adjustment is necessary, as shown in FIG. 18a. Defective adjustment may result in a track path of the kind shown in FIG. 18b: the ends of the inclined track are remote from the edge of the magnetic tape at the bottom. At the top a part of the track and consequently a part of the information are lost. By simple operation of the height adjusting bearing 67 by means of round-headed screws, which are accessible on the chassis plate 50, accurate adjustment as shown in FIG. 18a can be achieved.

Individual forms of construction of the guide mechanism of the tape extraction device will now be described below in greater detail. FIG. 19 shows a form of construction which is very similar to FIG. 16, but in which the rods 51,52 are articulated direct to the correspondingly widened, plate-like rack frame 55, as previously indicated in the description of FIG. 16.

Figure 20:
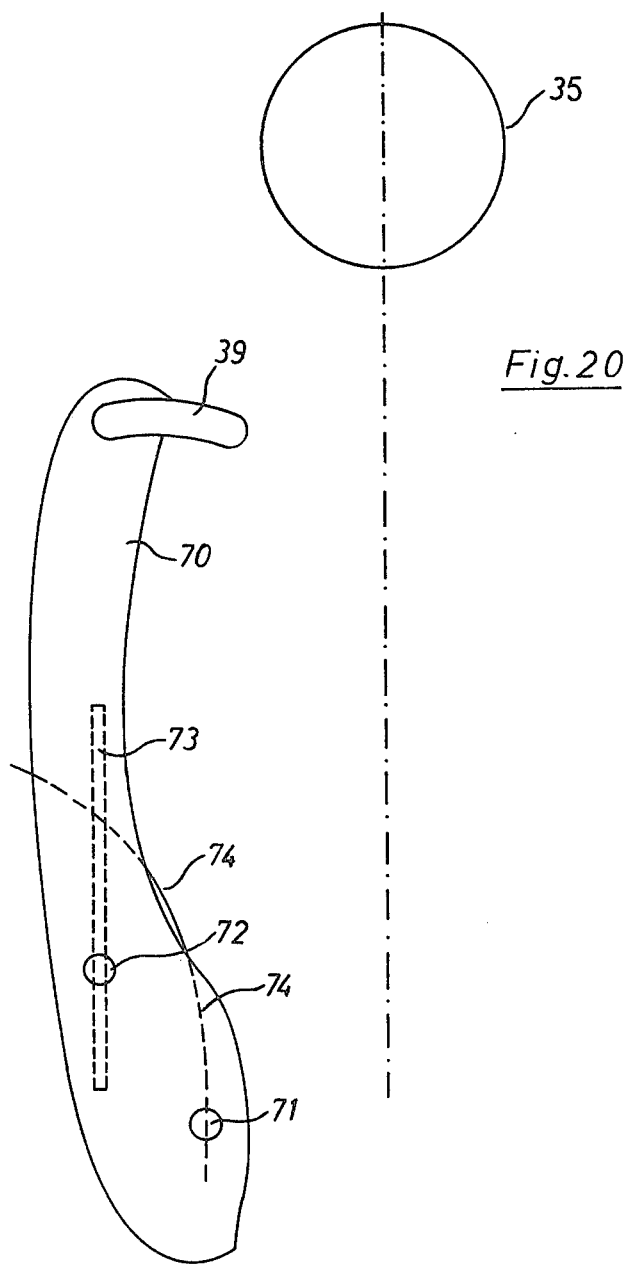

FIG. 20 shows a guide mechanism fo the gripper 39, with the aid of which the said gripper can be applied against the head drum 35 in the manner explained above. The gripper 38 obviously has a corresponding guide mechanism of the same kind. This guide mechanism consists of a guide lever 70 of the Indian club shape shown in FIG. 20. The guide lever 70 lies roughly parallel to the tape extraction direction shown in dash-dot lines in the Figure. At its front end facing the head drum 35 it carries the gripper 39. At its other end, which is widened in the shape of an Indian club, the lever is provided with a guide pin 71 and a driving pin 72. The driving pin 72 combines the function of guidance with the function of a force application point on the guide lever 70, to which for example the driving force for the tape extraction movement is here transmitted by the rack control system previously explained. The guide lever 70 consists of a flat metal plate, which in turn is laid on the chassis plate 50 or another auxiliary plate of the guide mechanism. This chassis plate 50 or the auxiliary plate now has a straight guide slot 73 as guide for the driving pin 72 and a curved guide path 74 as guide for the guide pin 71. The straight guide slot 73 is at least almost parallel to the tape extraction direction shown in dash-dot lines. The curved guide path 74 is roughly parallel to the tape extraction direction in its portion farthest from the head drum 35, but moves increasingly away from that direction as it approaches the head drum 35. In addition, the guide pin 71 and the driving pin 72 are so constructed, in the manner shown in the Figure, that the guide pin 71 is disposed at the outermost bottom end of the guide lever 70 but the driving pin 72 is disposed between the guide pin 71 and the gripper 39 and can be at a distance from the said gripper which is three times its distance from the guide pin 71.

If the guide lever 70 in FIG. 20 is now moved in the tape extraction direction, and if through the force of a spring the guide pin 71 is continuously held bearing against the curved guide path 74, in the movement towards the head drum 35 the entire guide lever 70 is rocked about the driving pin, which is guided in the straight guide slot, in such a manner that the gripper 39 finally comes into the position behind the head drum 35 as shown in FIG. 14f.

FIGS. 21 to 26 will serve to explain another embodiment. FIGS. 21 to 24 show the guide mechanism in this embodiment similarly to FIGS. 16 and 19, while in the view in perspective shown in FIGS. 25 and 26 the direction of viewing is over the head drum 35 towards the cassete 10.

Figure 21:
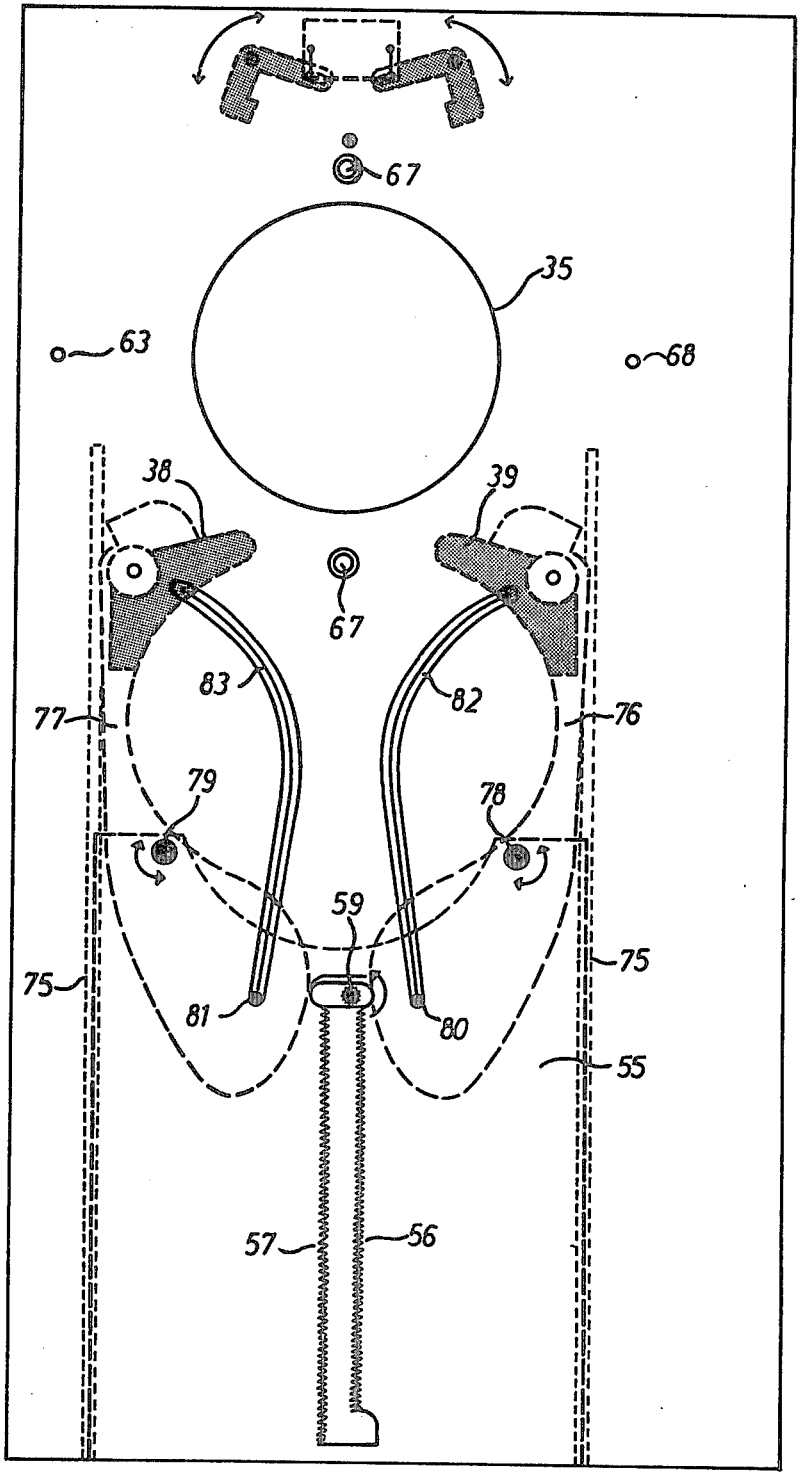
FIGS. 21 to 24 show another example of construction of the guide mechanism of the tape extraction device in various operating positions.

FIG. 21 shows a rack frame 55, which is once again in the form of a plate and which lies under and parallel to the chassis plate 50, being guided in a parallel guide consisting of slide rails 75 and mounted from below on the chassis plate 50, for a movement in the tape extraction direction. The drive for this movement is effected once again in the manner already described above by means of the gear 59 carried by the spring system and selectively brought into engagement with one or the other of the racks 56,57. The grippers 38,39 are remotely triangular in shape. The inner corners of the triangle, which in the end position overlap behind the head drum 35, are rounded in kidney shape. The base side facing the head drum, as tape guide surface, is curved in the form of an arc of a circle, like the kidney-shaped grippers 38,39, in accordance with the embodiment described above. The corner of the grippers 38,39 lying opposite this base side carries in each case a cylinder 44, the periphery of which projects slightly beyond the contour line of the gripper body and serves to deflect the portion of tape passing into the cassette.

The grippers 38,39 are disposed at the front end of rocking levers 76,77, which are of Indian club shape, as shown in the Figure. The rocking levers 76,77 are connected to the rack frame 55 on pivot pins 78,79. They may be disposed on the side of the rack frame 55 remote from the chassis plate 50. Since however the rack frame 55 is slightly lifted off the chassis plate 50 by the slide rails 75, the rocking levers 76,77 are expediently disposed in the gap between the surface of the chassis plate 50 and the bottom face of the rack frame 55. Since the pivot pins 78,79 are fastened to the plate-shaped rack frame 55, which in turn is guided in the slide rails 75 parallel to the tape extraction direction, separate straight guidance of the kind explained above in connection with the straight guide slot 73 in FIG. 20 is not required in the present case. However, a guide system corresponding to the curved guide path 74 and comprising guide pins 80, 81, which are fastened to the rocking levers 76,77, is necessary. The guide pins 80, 81 have the form of cylindrical pins which project downwards from the rocking levers 76,77 and run in curved slots 82,83 which are formed in the chassis plate 50.

The relative position shown in FIG. 21 of the pivot pins 78,79 and guide pins 80,81 on the rocking levers 76,77 has in turn the effect that when the gear 59 is correspondingly operated the tape extraction device first guides out of the cassette the magnetic tape 16 running over the grippers 38,39, then guides it in front of and finally behind the head drum 35, around which the magnetic tape is finally laid with an angle of wrap of more than 360°. The individual steps are explained separately below with the aid of the following Figures.

FIG. 22a first shows an embodiment, which has been slightly modified or supplemented in relation to FIG. 21, in the starting position which is also shown in FIG. 21.

Here there is additionally provided a bow spring 84, which is fastened at a fastening point 85 on the chassis plate 50 and at a fastening point 86 on the plate-shaped rack frame 55. The fastening point 85 on the chassis plate slies directly next to a slide rail 75 and roughly at the centre of the longer side, lying in the tape extraction direction, of the plate-shaped rack frame in the starting position of the latter. The fastening point 86 on the plate-shaped rack frame lies at the side of the rack 57, on the side remote from the fastening point 85 of the rack opening 58, approximately one-third along the total length of the rack 57, nearer its end remote from the head drum 35. The fastening point 86 thus lies in the starting position nearer the bottom edge (at the bottom in FIG. 22a) of the plate-shaped rack frame than the fastening point 85. Given a suitable length of the bow spring 84, the latter is thus able to give to the plate-shaped rack frame two defined end positions in its slide guide formed by the slide rails 75.

Figure 24:
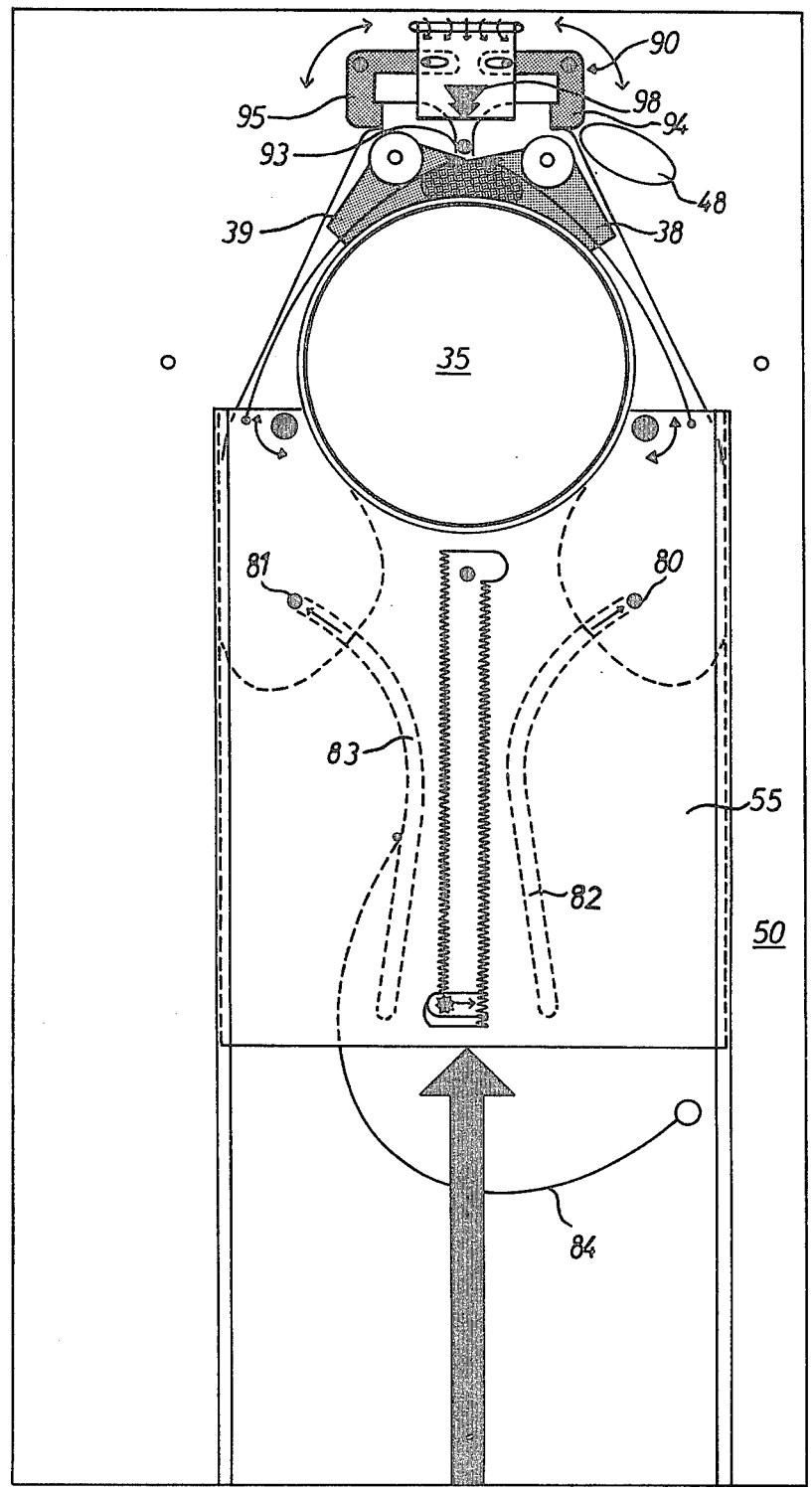

On end position, the bottom end position, is shown in FIG. 22a. The bow spring 84 pulls the slide plate into this end position, in which the guide pins 80,81 run onto the bottom ends of the curved slots 82,83 and thus form stops for a defined end position. The other (upper) end position is shown in FIG. 24. Here again the bow spring 84 pushes the plate-shaped rack frame 55 so far upwards onto the head drum that the guide pins 80,81 run onto the upper ends of the curved slots 82,83 and thus clearly define an end position. In the intermediate positions the bow spring 84 scarcely applies a force to the plate-shaped rack frame 55, since then the fastening points 85,86 lie more or less at the same height. The drive for the movement therefore does not have to overcome additional forces. The bow spring, acting as jump spring, thus ensures that the plate-shaped rack frame and all parts connected to it always have an accurately defined end position both when retracted and when extended. These accurately defined end positions are necessary not only in respect of the grippers, but also because of the continuously rotating gear 59 and its disconnection from the racks 56,57 in the end positions.

FIGS. 22a and 22b show another expedient development, which has already been briefly discussed above. This relates to the slide lifter 48. As shown in FIG. 22a, this component is disposed in the path of movement of the upper gripper 38 behind the head drum 35, just before the end position. FIG. 22b shows the cross-sectional shape of the slide lifter. It can be seen that both at its run-on end and at its run-off end the slide lifter has a diminishing height, so that the gripper 38 can run onto the slide lifter without difficulty from the surface of the chassis plate 50 serving as guide for it. The upper gripper is lifted out within the clearance available in the guide mechanism, so that between its lower face and the upper face of the bottom gripper 39 the distance shown in FIG. 15b is obtained. The height of lift achieved by the slide lifter 48 thus ensures that at the moment when the overlapping of the paths of the grippers 38,39 commences the lower face of the gripper 38 definitely lies above the upper face of the gripper 39. The maximum height of lift is obtained about 30° before the end position, if the periphery of the drum 35 is taken as reference point. As can be seen in FIG. 22b, the height of lift is thereupon reduced again, so that shortly before the end position is reached the gripper 38 is placed from above over the gripper 39 and makes contact with it.

It has been stated above that the guide mechanism must have a certain play. This play is indispensable for the movements explained, since otherwise excessive forces would be necessary. On the other hand, however, play in the end position is undesirable. Here it is on the contrary important that the grippers, which in this end position still serve, as previously, as tape guide elements, should have a constant, reliably reproducible position. For this reason a clamp lever device 90 is provided in order to hold the grippers 38,39 without play in the end position. For this purpose the front ends of the rocking levers 76,77 carrying the grippers are of a special shape. As can be seen in detail in the Figures, they have front flanks 91,92 which in the end position shown in FIG. 24 lie parallel to the tape extraction direction and a short distance apart on both sides of the longitudinal plane of symmetry of the tape extraction device. (see dash-dot line in FIG. 20), which plane passes through the axis of the head drum. In the longitudinal plane of symmetry of the entire belt extraction device there is now provided at this point, behind the head drum 35, a stop pin 93 onto which the front flanks 91,92 of the rocking levers 76,77 run from both sides in the end position. An accurately defined end position is thus also ensured for the rocking levers with the simplest means. From this end position the grippers could however still be lifted laterally through the action of forces transmitted to them through the magnetic tape. The clamp lever device is therefore additionally provided with two locking levers 94,95. These are in the form of angle levers and are rockable about a vertical pivot disposed at the angle and carried by the chassis plate 50, as indicated by double arrows in the Figures. That arm of the locking levers 94,95 which lies nearer the head drum 35 is provided with a nose which extends parallel to the other arm and whose locking surface is however parallel to the arm itself. Corresponding to these locking surfaces, steps 96,97 are provided on the side of the rocking levers 76,77 which is remote from the front flanks 91,92 or head drum 35 or stop pin 93, in the region carrying the grippers 38,39. The locking surfaces of the steps 96,97 lie parallel to the front flanks 91,92. When, as can best be seen in FIG. 24, the arms of the locking levers 94,95 on the head drum side engage behind the step surfaces 96,97, the rocking levers are pressed without play on to the stop pin 93, and can no longer lift off laterally from the said pin. The grippers 38 and 39 are then also fixed with their circular surfaces on the periphery of the head drum 35, without being able to lift off the latter.

Figure 23:
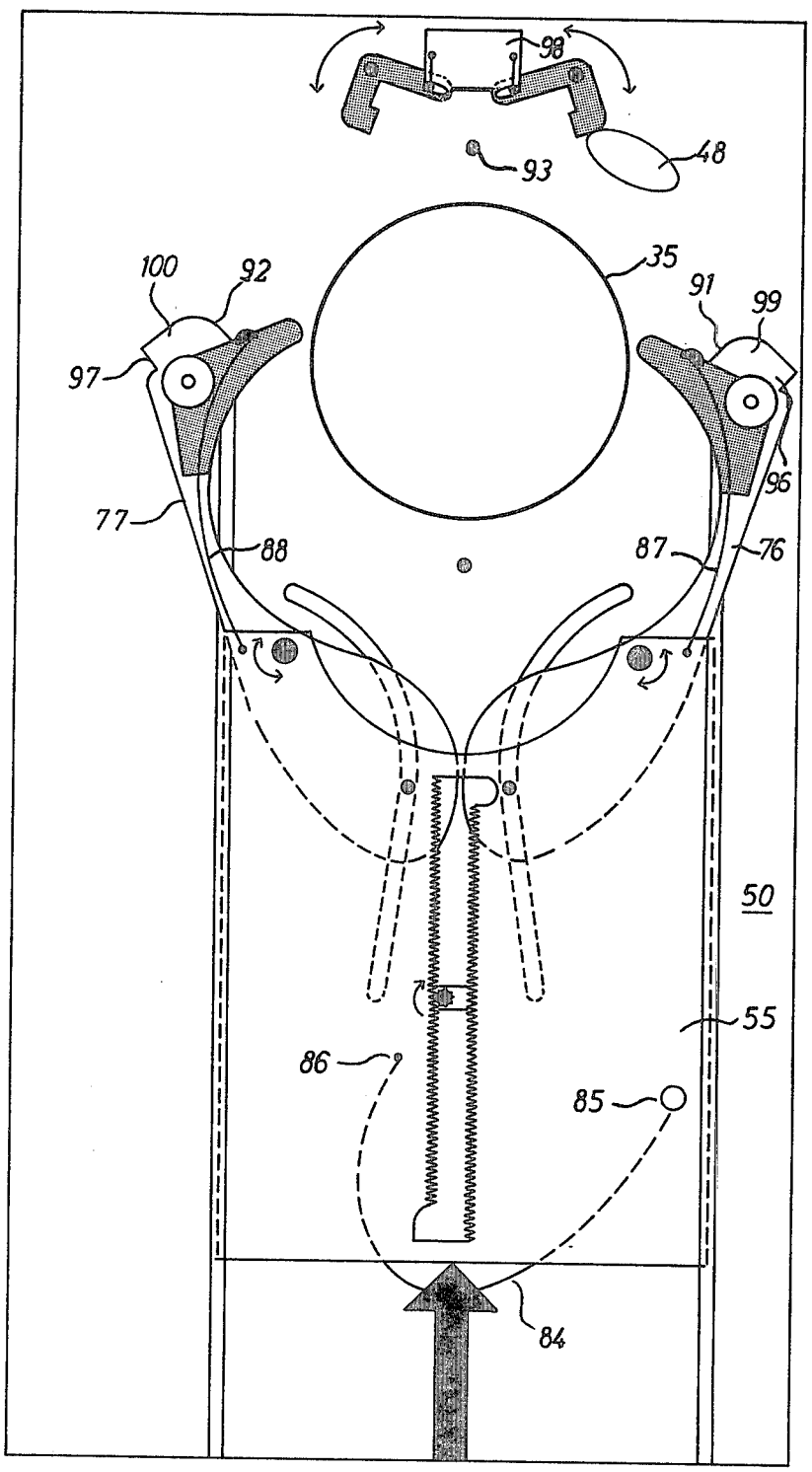

The clamp lever device 90 is in addition provided with a clamp plate 98 suitably connected to the locking levers 94,95. This clamp plate is so constructed that in pivoted positions of the locking levers 94,95 which are shown in FIG. 22a and FIG. 23 their end pointing towards the head drum 35 points obliquely upwards. In the end position the clamp plate 98 however lies at the top on stop surfaces 99,100 at the front end of the rocking levers 76,77 when the locking levers 94,95 have been pivoted behind the steps 96,97. These stop surfaces 99,100 are horizontal surfaces and on their edges are provided with the steps 96, 97 on the side remote from the head drum 35. Through the pressure applied in the end position from above to the stop surfaces 99,100 (as indicated by an arrow in FIG. 24), the rocking levers 76,77 are pressed onto the chassis plate 50 and thus held at an accurately defined vertical height in relation to the head drum 35 likewise fastened on the chassis plate 50.

By means of the clamp lever device 90 therefore a working position which is always identical and free from play is fixed for recording and playback in the end position. Since locking is required only in this case, the clamp lever device 90 is operated, on operation of the recording or playback lever, by means of a linkage known to the specialist or by means of an electromechanical control arrangement also familiar to the specialist.

A reference has previously been made to the tape guide elements 28,29 in connection with FIG. 7 and subsequent Figures, particularly FIG. 12, these guide elements having a conical shape in order to prevent "piping" of the tape. It is however possible to prevent this by means of the oppositely conical tape guide elements 28,29 only when the magnetic tape 16 is completely retracted into the cassette, so that it runs over these tape guide elements and is suitably supported by them. However, piping may again occur while the magnetic tape is being pulled out of the cassette and thus is at least to a substantial extent lifted off the tape guide elements 28,29. In these intermediate positions, although the tape is not driven, so that piping does not give rise to any considerable difficulties in respect of locally concentrated tape stress, nevertheless accurate contact between the magnetic tape 16 and the periphery of the head drum 35 is essential. If because of the piping some loose portions of tape are formed during the transfer of the magnetic tape from the tape guide elements to the periphery of the head drum, accurate laying of the magnetic tape by means of the grippers 38,39 against the drum may be made difficult. This disadvantage is now overcome by providing the grippers with equalising slopes which act progressively during the operation of extracting the tape and which always maintain a uniform tape tension over the entire width of the tape.

FIGS. 22c and 22d show the arrangement of the equalizing slopes for the bottom gripper 39 and the top gripper 38 with the aid of equalizing springs 87 and 88 respectively.

It can clearly be seen from FIGS. 22c and 22d how the equalizing springs 87,88 are arranged: a rear end of the springs is bent over and mounted in the plate-shaped rack frame 55, in the direct proximity of the pivot pins 78,79 which connect the rack frame 55 to the rocking levers 76,77. The equalizing springs 87,88 then extend over the rocking levers as far as the grippers 38,39 which have a slot guide through which the equalizing springs 87, 88 pass. The front end of the equalizing springs 87,88 can pass out of the slot guide from the guide surface of the grippers 38,39 and into the region between their kidney-shaped guide noses, which point towards one another, and the cylinders 44. As can clearly be seen in FIGS. 22c and 22d, the front end of the equalizing springs is in each case formed by an upwardly bent loop, of which one vertical side remains inside the guide slot while the other side, lying further out, projects conically upwards in the case of the bottom equalizing spring 88, and conically downwards in the case of the top equalizing spring 87. The resulting angles correspond to the angles of the conical tape guide elements 28,29. These equalizing points for straightening pipes formed in the tape may also be disposed elsewhere on the grippers.

In the starting position shown in FIG. 22a the equalizing springs project beyond the periphery of the grippers in the manner only indicated in FIG. 22a but clearly shown in FIGS. 22c and 22d. If the tape extraction device is now operated, the grippers will lift the magnetic tape 16 off the tape guide elements 28,29 by means of the projecting portions of the equalizing springs, so that the formation of pipes is prevented and the magnetic tape is subjected at all points to uniform tape tension. As the plate-shaped rack frame continues to pass out, the equalizing springs 87,88 continuously move out to an ever increasing extent. When however finally the rocking levers 76,77 swing behind the head drum 35, the distance from the points of articulation of the equalizing springs on the rack frame 55 to the outlet surface increases, so that the equalizing springs are pulled back into the interior of the grippers. In the end position shown in FIG. 24 the equalizing springs are completely contained inside the grippers and do not impair the uniform guiding of the tape for the purpose of recording and playback. However, during the operations of extracting and retracting the tape the equalizing springs 87,88 prevent any formation of pipes in the magnetic tape.

FIG. 25 corresponds in the form of a view in perspective to FIG. 23, but the direction of viewing is over the clamp lever device 90 and the head drum 35 towards the cassette 10. With the same direction of viewing, FIG. 26 corresponds to the end position which is shown in plan view in FIG. 24.

I claim:

1. An apparatus for the recording and reproduction of signals, particularly video signals, on a magnetic tape (16) which is disposed in a cassette (1) on spools (11, 12) which lie concentrically one above the other, and having means whereby it is adapted to be laid, in two loops moving in opposite directions towards one another, against the periphery of a slit head drum (35), in which at least one magnetic head rotates, comprising a tape extraction device having a pair of grippers (38, 39) initially positioned within the cassette on the side of the tape remote from the drum, said device being mounted on a chassis plate, said grippers (38, 39) being disposed in different planes in their end position in which the magnetic tape (16) spans helically and contacts over an angle of at least 360° circumferentially around the head drum (35), the head drum having means whereby it is obliquely adjustable in relation to the chassis plate, one of said grippers being an upper gripper and said upper gripper (38) being in the form of an arcuate tape guide body and being disposed at a greater normal distance from the chassis plate (50), and having an upper edge (40) for positioning the upper edge of the tape, and the other gripper being a lower gripper (39) being disposed at a lesser normal distance from the chassis plate and being likewise in the form of an arcuate tape guide body and having a lower guide edge (41) for positioning the bottom edge of the tape, the vertical height of each gripper (38, 39) is slightly greater than the width of the magnetic tape (16), said upper gripper (38) in said end position being supported by a portion of its lower edge on a portion of the upper edge of the lower gripper (39), and the horizontal length of said tape guide bodies defined by said grippers (38, 39) holds at a distance from the periphery of the head drum the tape loops guided towards and away from the head drum (35).

2. An apparatus according to claim 1, wherein said the tape guide bodies formed by said grippers (38,39) have a curvature in the direction of their length, and are at least partly kidney-shaped in plan view.

3. The apparatus according to claim 2, wherein said tape guide bodies formed by said grippers (38,39) have a cylindrical surface on their tape guide surface which in the end position faces the head drum (35), which cylindrical surface merges into a deflecting surface rounded roughly in kidney shape in order to divert the magnetic tape from the periphery of the head drum.

4. The apparatus according to claim 3, wherein said the grippers (38,39) each have at least one vertically disposed cylinder (44) and/or a roller which is connected to the other vertical tape guide surfaces of the grippers (38,39).

5. The apparatus according to one of claims 1–4, wherein said grippers (38,39) are provided with equalizing slopes which on the extraction of the tape project beyond the otherwise vertical tape guide surfaces of the grippers, projecting progressively downwards starting from the top guide edge on said upper gripper (38), and progressively upwards starting from the bottom guide edge on said lower gripper (39), and that the equalizing slopes, formed by equalizing springs (87,88) are drawn back again behind the tape guide surfaces of the grippers in the end position.

6. The apparatus according to one of claims 1–4, wherein said grippers (38, 39) are supported in the end position against a stop pin (93) on the side of the head drum remote from the cassette and which projects upwards from said chassis plate (50).

7. The apparatus according to claim 6, further comprising there is additionally provided a clamp lever device (90) having two locking levers (94,95) pressing the grippers (38,39) from outside onto the stop pin (93) on operation of the record or playback function.

8. The apparatus according to claim 7, wherein said clamp lever device (90) additionally has a clamp plate (98) which is coupled to said locking levers (94,95) and which on operation of the record or playback function presses horizontal stop surfaces (99,100) of said grippers (38,39) from above onto said chassis plate (50).

9. The apparatus according to claim 1, wherein the guide path of each gripper (38,39) during its movement, starting from its position in an appertaining cutout (36,37) in the cassette (10) and as far as the head drum (35), first has a tangential path element, an adjoining curved path element, and finally a path element, which adjoins the curved path element, for applying the magnetic tape (16) against the periphery of the head drum and directed radially in relation to the head drum (35).

10. The apparatus according to claim 9, further comprising in the guide path of said upper gripper (38) there is provided on the chassis plate (50), in the region of the transition from the curved to the radial path element, a slide lifter (48) which has a vertical height gradually increasing to a maximum in the direction of movement and then decreasing again, and by which said upper gripper (38) is guided above and at a distance from said lower gripper (39) with a lift height corresponding to the maximum.

11. The apparatus according to claim 10, wherein said grippers (38,39) engage crossingly one over the other by their tape guide surfaces in their extracted end position, so that the bottom tape loop is guided by said lower gripper (39) and the lower face of said upper gripper (38), and the top tape loop is guided by said upper gripper (38) and the upper face of said lower gripper (39).

12. The apparatus according to claim 1, wherein each gripper (38,39) is disposed at the front end of a rocking lever (51,52;76,77) whose rocking axis (72;78,79) lies in the region of the other end of the rocking lever and is guided in a straight guide (73) parallel to the tape extraction device each rocking lever having so as to form a lever arm in relation to the rocking axis (72;78,79), a guide pin (80,81) guided along a curved guide path (82,83).

13. The apparatus according to claim 12, wherein the curved guide path (74) is in the form of a rail or curved slot (82,83).

14. The apparatus according to claim 13, wherein the curved slots (82,83) are disposed in said chassis plate (50), said guide pins (80,81) are guided in the curved slots at the rear end of the rocking levers (76,77) which at their front end carry said grippers (38,39), the rocking axes (78,79) of said rocking levers (76,77) lie approximately in the center between the two ends of these levers and are carried by a slide plate (55), and said slide plate is guided for sliding in slide rails (75) provided on the chassis plate parallel to the tape extraction direction.

15. The apparatus according to claim 14, further comprising a bow spring (84) fastened by one end to said chassis plate (50) and by its other end to said slide plate (55) and has a length such that in the two end positions of the sliding movement of said slide plate said guide pins (80,81) are pulled or pressed under the action of said bow spring (84) to the ends of curved slots (82,83).

16. The apparatus according to one of claims 9 to 15, further comprising a drive means for driving the tape extraction device comprising a rack frame (55), in the form of a slide plate having two racks (56,57) which are disposed parallel to the tape extraction device and are spaced apart from one another by a distance which is greater than the diameter of a continuously rotating gear (59) which is associated with them as driver and which can be selectively brought by a jump spring system into engagement with one or the other of the racks and at the ends of the rack opening (58), which is formed by the two racks (56,57), runs in each case from the rack in engagement with it into a widened cut-out in which it remains out of engagement with both racks until the jump spring system is operated again.

17. The apparatus according to claim 1, wherein the spools (11,12) of the cassette (10) are each provided with a tape plate (13,14) which on its periphery is formed as a gear and is associated with a driving gear (21,22) which through a cutout (17,18) in a side surface of the cassette (10) can be brought into driving engagement with the tape plate (13,14).

18. The apparatus according to claim 17, wherein the drive gears (21,22) for the upper tape plate (13) and the lower tape plate (14) are mounted with their driving spindles (19,20) on a common rocking lever (27) which for the purpose of adaptation to different sizes of cassette (10,10') is arranged for rocking about the vertical axis approximately in the middle of a side surface of the cassette.

19. The apparatus according to claim 1, wherein the head drum is fastened on a carrier plate (60) which has four-point mounting and which in one bearing point is pressed by a pressure spring against said chassis plate (50), in two other bearing points is pressed away from said chassis plate, and in a fourth bearing point is provided with an adjusting screw (68) for adjusting the inclination of the head drum axis (61).

20. The apparatus according to claim 19, wherein said bearing points are distributed around the periphery of the head drum (35).

* * * * *